(12) United States Patent
Matz et al.

(10) Patent No.: US 7,006,831 B2
(45) Date of Patent: Feb. 28, 2006

(54) APPARATUS AND METHOD FOR PROVIDING DYNAMIC COMMUNICATIONS NETWORK TRAFFIC CONTROL

(75) Inventors: William R. Matz, Atlanta, GA (US); Douglas R. O'Neil, Marietta, GA (US); James R. Bacon, Norcross, GA (US); Vernon Meadows, Lilburn, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 12 days.

(21) Appl. No.: 10/261,132

(22) Filed: Sep. 27, 2002

(65) Prior Publication Data

US 2004/0072574 A1 Apr. 15, 2004

(51) Int. Cl.
*H04Q 7/20* (2006.01)

(52) U.S. Cl. .................. 455/453; 455/406; 455/414.1

(58) Field of Classification Search ................ 455/453, 455/450, 451, 452.1, 414, 405, 406, 408
See application file for complete search history.

(56) References Cited

U.S. PATENT DOCUMENTS

| 4,670,899 | A | * | 6/1987 | Brody et al. ............... 455/453 |
| 4,803,679 | A | | 2/1989 | Shimizu |
| 5,131,020 | A | | 7/1992 | Liebesny et al. |

(Continued)

FOREIGN PATENT DOCUMENTS

| EP | 0 370 826 A2 | 5/1990 |
| EP | 0 717 579 A2 | 6/1996 |
| EP | 0 752793 | 1/1997 |
| WO | WO 97/11566 | 3/1997 |
| WO | WO 97/16040 | 5/1997 |

OTHER PUBLICATIONS

European Search Report dated Mar. 11, 2005, on Application No. 04078485.2.
"Digital Cellular Telecommunications System (Phase 2+) GSM); Universal Mobile Telecommunications System (UMTS); enhanced Multi–Level Precedence and Pre-emption Service (eMLPP) –Stage 3 (3G TS 24.067 version 3.0.0 Release 1999)," Global System for Mobile Communication, ETSI TS 124 067 3.0.0 v3.0.0 (2000–01).
"Digital Cellular Telecommunications System (Phase 2+) (GSM); Universal Mobile Telecommunications System (UMTS); enhanced Multi–Level Precedence and Pre-emption Service (eMLPP) –Stage 2 (3G TS 23.067 version 3.0.0 Release 1999)," Global System for Mobile Communication, ETSI TS 123 067 3.0.0 v3.0.0 (2000–01).

(Continued)

*Primary Examiner*—Temica Beamer
(74) *Attorney, Agent, or Firm*—Merchant & Gould, LLC

(57) ABSTRACT

Systems and methods for controlling traffic on a communications network include dynamic and flexible control plans that enable service providers to control or influence customer access to communications facilities. Communications facilities are monitored to identify network elements, such as cell sites, that are overloaded. When the traffic intensity on a particular facility exceeds a predetermined level, either active or passive control is imposed on subscribers that are in the geographic area of the facility. Active control involves blocking, delaying or disrupting subscriber calls during the critical time period. Passive control involves providing cost incentives or disincentives during low or peak periods of traffic intensity. Customers are notified of the commencement and/or termination of active or passive control preferably via SMS. When implemented with stationary cellular service, the systems and methods aid in traffic engineering and provide opportunities for customers to reduce the cost and increase the accessibility of telephone service.

33 Claims, 7 Drawing Sheets

U.S. PATENT DOCUMENTS

| | | |
|---|---|---|
| 5,157,709 A | 10/1992 | Ohteru |
| 5,226,071 A | 7/1993 | Bolliger et al. |
| 5,343,511 A | 8/1994 | Osada |
| 5,404,355 A | 4/1995 | Raith |
| 5,457,735 A | 10/1995 | Erickson |
| 5,513,242 A | 4/1996 | Mukerjee et al. |
| 5,521,925 A | 5/1996 | Merakos et al. |
| 5,539,729 A | 7/1996 | Bodnar |
| 5,539,923 A | 7/1996 | Matsumoto |
| 5,570,411 A | 10/1996 | Sicher |
| 5,574,977 A * | 11/1996 | Joseph et al. ............... 455/450 |
| 5,583,869 A | 12/1996 | Grube et al. |
| 5,615,249 A | 3/1997 | Solondz |
| 5,649,299 A * | 7/1997 | Battin et al. .................. 455/62 |
| 5,678,179 A | 10/1997 | Turcotte et al. |
| 5,694,455 A | 12/1997 | Goodman |
| 5,708,968 A | 1/1998 | Suzuki |
| 5,729,541 A | 3/1998 | Hamalainen et al. |
| 5,732,073 A | 3/1998 | Kusaki et al. |
| 5,742,588 A | 4/1998 | Thornberg et al. |
| 5,752,193 A | 5/1998 | Scholefield et al. |
| 5,761,618 A | 6/1998 | Lynch et al. |
| 5,787,080 A | 7/1998 | Hulyalkar et al. |
| 5,787,358 A | 7/1998 | Takahashi |
| 5,790,522 A | 8/1998 | Fichou et al. |
| 5,812,656 A | 9/1998 | Garland et al. |
| 5,832,384 A | 11/1998 | Balachandran et al. |
| 5,857,018 A | 1/1999 | Sumner et al. |
| 5,862,485 A | 1/1999 | Linneweh, Jr. et al. |
| 5,867,790 A | 2/1999 | Hamada |
| 5,914,945 A | 6/1999 | Abu-Amara et al. |
| 5,926,469 A | 7/1999 | Norstedt et al. |
| 5,930,239 A | 7/1999 | Turcotte |
| 5,974,308 A * | 10/1999 | Vedel .......................... 455/407 |
| 6,009,331 A | 12/1999 | Ueda |
| 6,026,289 A | 2/2000 | Zellner et al. |
| 6,055,426 A | 4/2000 | Beasley ....................... 455/432 |
| 6,069,882 A | 5/2000 | Zellner et al. |
| 6,091,709 A | 7/2000 | Harrison et al. |
| 6,101,389 A | 8/2000 | Koizumi et al. |
| 6,115,613 A * | 9/2000 | Jonsson ....................... 455/519 |
| 6,175,621 B1 | 1/2001 | Begeja |
| 6,192,248 B1 | 2/2001 | Solondz |
| 6,201,966 B1 | 3/2001 | Rinne et al. |
| 6,226,277 B1 | 5/2001 | Chuah |
| 6,240,287 B1 * | 5/2001 | Cheng et al. ................ 455/453 |
| 6,282,429 B1 | 8/2001 | Baiyor et al. |
| 6,321,093 B1 | 11/2001 | Dalal |
| 6,327,364 B1 | 12/2001 | Shaffer et al. |
| 6,335,922 B1 | 1/2002 | Tiedemann, Jr. et al. |
| 6,347,224 B1 * | 2/2002 | Smyth et al. ................ 455/406 |
| 6,373,399 B1 | 4/2002 | Johnson et al. ......... 340/870.11 |
| 6,377,548 B1 | 4/2002 | Chuah |
| 6,421,335 B1 | 7/2002 | Kilkki et al. |
| 6,434,380 B1 | 8/2002 | Andersson et al. |
| 6,470,024 B1 | 10/2002 | Hamalainen et al. |
| 6,484,145 B1 * | 11/2002 | Home et al. .................... 705/8 |
| 6,519,260 B1 | 2/2003 | Galyas et al. |
| 6,522,653 B1 | 2/2003 | Kilkki |
| 6,526,282 B1 * | 2/2003 | Kadoshima et al. ......... 455/453 |
| 6,549,938 B1 | 4/2003 | Kilkki et al. |
| 6,567,416 B1 | 5/2003 | Chuah |
| 6,567,665 B1 * | 5/2003 | Kissee ......................... 455/436 |
| 6,574,475 B1 | 6/2003 | Suzuki ......................... 455/438 |
| 6,587,433 B1 | 7/2003 | Borella et al. |
| 6,628,942 B1 | 9/2003 | Beming et al. |
| 6,631,270 B1 * | 10/2003 | Dolan .......................... 455/453 |
| 6,678,526 B1 * | 1/2004 | Sugirtharaj ................. 455/450 |
| 6,690,929 B1 * | 2/2004 | Yeh ............................. 455/406 |
| 6,813,488 B1 | 11/2004 | Marsh et al. |
| 2001/0036173 A1 | 11/2001 | Shmulevich et al. ........ 370/352 |
| 2002/0025799 A1 | 2/2002 | Takae et al. |
| 2002/0107000 A1 | 8/2002 | Goss et al. .................. 455/405 |
| 2003/0086405 A1 | 5/2003 | Silva et al. .................. 370/342 |
| 2003/0148771 A1 | 8/2003 | De Veneuil ................. 455/456 |

OTHER PUBLICATIONS

"Digital Cellular Telecommunications System (Phase 2+) (GSM); Universal Mobile Telecommunications System (UMTS); Enhanced Multi–Level Precedence and Pre–emption Service (eMLPP) –Stage 1 (3G TS 22.067 version 3.0.1 Release 1999)," Golobal System for Mobile Communication, ETSI TS 122 067 V3.0.1 (2000–01).

"Digital Cellular Telecommunications System (Phase 2+) (GSM); Universal Mobile Telecommunications System (UMTS); Service Accessibility (3G TS 22.011 version 3.1.0 Release 1999), "Global System for Mobile Communication, ETSI TS 122 011 V3.1.0 (2000–01).

"Digital Cellular Telecommunications System (Phase 2+); High Speed Circuit Switched Data (HSCSD) –Stage 2 (GSM 03.04)," Global System for Mobile Communication, TS 101 038 V5.0.1 (1997–04).

"Digital Cellular Telecommunications System (Phase 2+); High Speed Circuit Switched Data (HSCSD) –Stage 1 (GSM 02.34)," Global System for Mobile Communication, ETSI GSM 02.34 V5.1.0, Mar. 1997.

"Universal Mobile Telecommunications System (UMTS); UTRAN lu Interface RANAP Signalling (3G TS 25.413 version 3.0.0 Release 1999)," ETSI TS 125 413 V3.0.0 (2000–01).

"Digital Cellular Telecommunications System (Phase 2); Specification of the Subscriber Identity Module–Mobile Equipment (SIM–ME) interface (GSM 11.11 version 4.19.1)," European Telecommunication Standard, ETS 300 608, Jan. 1998.

In the Matter of "The Development of Operational, Technical and Spectrum Requirements for Meeting Federal, State and Local Public Safety Agency Communication Requirements Through the Year 2010," Federal Communications Commission FCC 00–242, Second Report and Order, Adopted Jul. 3, 200, Released Jul. 13, 2000.

"Differential Channel Allocation," Function Specification Mar. 155 17–ANT 240 07 Uen B.

"Radio Equipment and Systems (RES); Trans–European Trunked Radio (TETRA); Voice plus Data (V+D); Part 1: General network design" European Telecommunications Standards Institute, ETS 300 392–1, Feb. 1996.

"Radio Equipment and Systems (RES); Trans–European Trunked Radio (TETRA); Voice plus Data (V+D); Part 2: Air Interference (AI)," European Telecommunications Standards Institute, ETS 300 392–2, Mar. 1996.

"Terrestrial Trunked Radio (TETRA); Voice plus Data (V+D); Part 12: Supplementary services stage 3; Sub–part 16: Pre–emptive Priority Call (PPC)," European Telecommunications Standards Institute, final draft ETSI EN 300 392–12–16 v1.2.0 (2004–05).

"Terrestrail Trunked Radio (TETRA); Voice plus Data (V+D); Part 11: Supplementary services stage 2; Sub–part 16: Pre–emptive Priority Call (PPC)," European Telecommunications Standards Institute, ETS 300 392–11–16, Sep. 2000.

"Trans European Trunked Radio (TETRA) system; Technical requirements specification Part 1; Voice plus Data (V+D) systems;" European Telecommunications Standards Institute, ETR 086–1, Jan. 1994.

"Radio Equipment and Systems (RES); Trans–European Trunked Radio system (TETRA); Voice plus Data(V+D) Open channel" European Telecommunications Standards Institute, ETR 120, Nov. 1994.

"Radio Equipment and Systems (RES); Trans–European Trunked Radio (TETRA); User requirements for Subscriber Identity Module (SIM)" European Telecommunications Standards Institute, ETR 295, Aug. 1996.

"Terrestrial Trunked Radio (TETRA); Voice plus Data (V+D); Designers' guide; Part 1: Overview, technical description and radio aspects," European Telecommunications Standards Institute, ETR 300–1, May 1997.

"Radio Equipment and Systems (RES); Trans–European Trunked Radio (TETRA); Voice plus Data (V+D); Part 10: Supplementary Services stage 1; Part 10–01: Call identification" European Telecommunications Standards Institute, ETS 300 392–10–01, Apr. 1996.

"Radio Equipment and Systems (RES); Trans–European Trunked Radio (TETRA); Voice plus Data (V+D); Part 10: Supplementary Services stage 1; Part 10–09: Access priority" European Telecommunications Standards Institute, ETS 300 392–10–09, Apr. 1996.

"Radio Equipment and Systems (RES); Trans–European Trunked Radio (TETRA); Voice plus Data (V+D); Part 10: Supplementary Services stage 1; Part 10–16: Pre–emptive priority call" European Telecommunications Standards Institute, ETS 300 392–10–16, Apr. 1996.

"Digital Cellular Telecommunications System (Phase 2+); Enhanced Multi–Level Precedence and Pre–emption Service (eMLPP)–Stage 1 (GSM 02.67)", European Telecommunications Standards Institute, Global System for Mobile Communications Technical Specification, Version 5.0.1. Jul. 1996.

"Digital Cellular Telecommunications System (Phase 2+) Mobile Services Switching Centre–Base Station System (MSC–BSS) Interface; Layer 3 Specification (GSM 08.08)", European Telecommunications Standards Institute, Global System for Mobile Communications Technical Specification, Version 5.4.0, Nov. 1996.

Data Communications (Tech Tutorials) "Going the Distance with QOS, " Mike Seaman and Bob Klessig, 3Com Corp., Feb. 1999.

Data Communications (Tech Tutorials) "Serving Up QOS end to End," Marguerite Reardon, Nov. 21, 1998.

Data Communications (Tech Tutorials) "The Policy Makers," Stephen Saunders, May 1999.

International Search Report issued by the European Patent Office in PCT/US9815568, in the name of BellSouth Corporation, mailed Jan. 21, 1999.

Office Action issued by the USPTO having Ser. No. 09/559,594 on Feb. 24, 2004.

Office Action issued by the USPTO having Ser. No. 09/559,594 on Sep. 5, 2003.

Office Action issued by the USPTO having Ser. No. 09/922,042 on Dec. 8, 2003.

Office Action issued by the USPTO having Ser. No. 09/922,042 on May 8, 2003.

Office Action issued by the USPTO having Ser. No. 09/922,042 on Oct. 25, 2002.

Office Action issued by the USPTO having Ser. No. 09/559,593 on Feb. 17, 2004.

Office Action issued by the USPTO having Ser. No. 09/559,593 on Sep. 4, 2003.

Office Action issued by the USPTO having Ser. No. 10/260,262 on Jan. 14, 2005.

Office Action issued by the USPTO having Ser. No. 10/260,262 on Jul. 15, 2005.

* cited by examiner

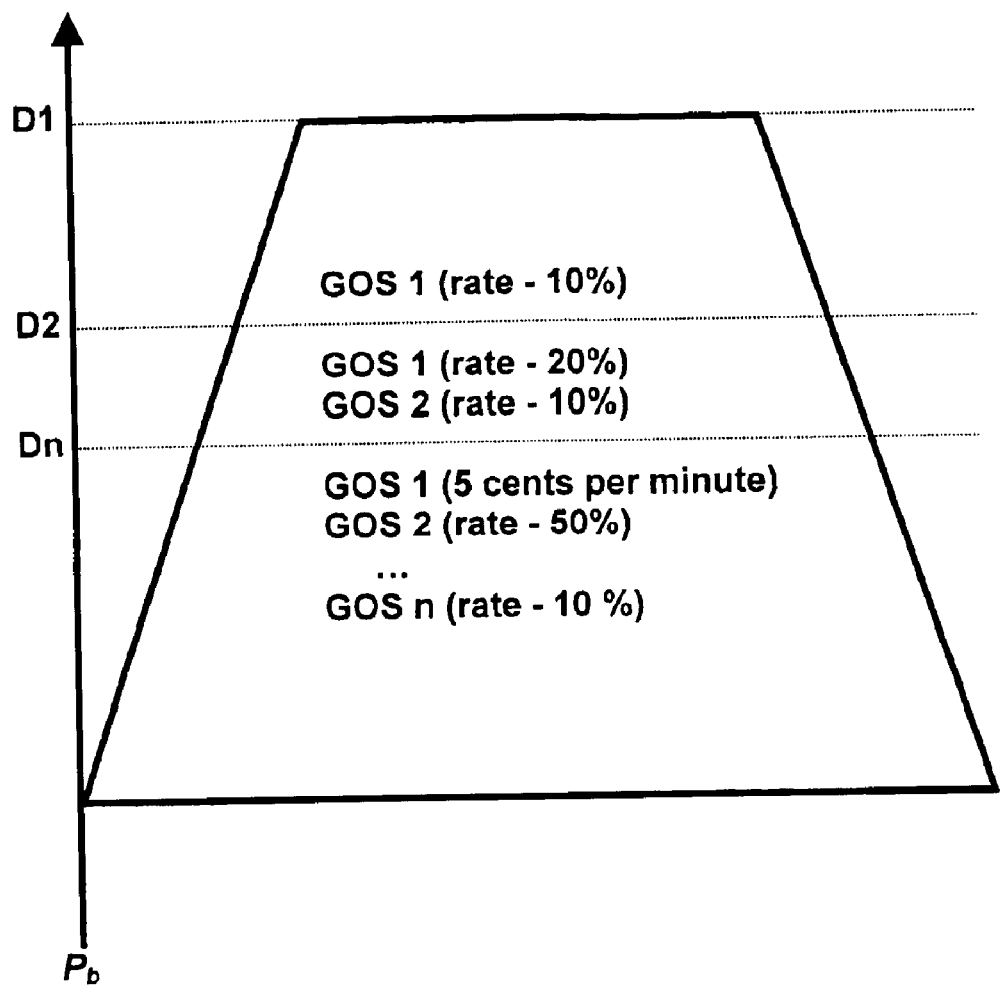

APPARATUS AND METHOD FOR PROVIDING DYNAMIC COMMUNICATIONS NETWORK TRAFFIC CONTROL

RELATED APPLICATION

This application is related to and incorporates in its entirety the co-pending application entitled, Apparatus and Method for Providing Reduced Cost Cellular Service, which was filed concurrently with this application, and is owned by the assignee of this application.

FIELD OF THE INVENTION

The present invention relates to telecommunications, and more particularly, to systems and methods for providing reduced cost cellular service by minimizing the cost of equipment, activation and service.

BACKGROUND OF THE INVENTION

"Plain old telephone service" (POTS) is ubiquitous in much of the world today. For a variety of reasons, however, cellular technology sometimes provides an attractive alternative to POTS, even for customers that do not need the mobility that cellular service inherently provides. For example, a low-income customer such as a college student may be somewhat transient, making repeated initiation and termination of POTS costly and inconvenient. The college student may share an apartment, rent a portion of someone else's home, or otherwise live in a situation in which expensive and intrusive rewiring of an additional POTS line would be unwelcome.

Provision of POTS requires the service provider to invest in infrastructure, such as placement and maintenance of buried and aerial telephone wire and cable, and of associated facilities. A significant portion of the populace may not have access to such an infrastructure. Even where the infrastructure exists, poor maintenance, and rugged conditions can impact the level of services. Thus, in some rural regions or developing countries, POTS is either unavailable or unreliable, with frequent outages and poor quality, even as compared to cellular service.

In these and other instances, cellular service would be preferable to POTS. Cellular service can be provided without installing and maintaining physical interconnections between the provider and the customer. The upfront and ongoing cost differentials between cellular service and POTS, however, present an entry barrier for many customers. The cost differentials are primarily attributable to the relatively expensive components in most cellular telephones, to labor and equipment required to activate the cellular telephone, and to monthly service charges for cellular service.

A typical cellular telephone includes a rechargeable battery, battery charging components, a display screen, an antenna, and electronic elements for providing continuous service while "handing-off" from one cell site to another. A basic non-cellular "land-line" telephone requires none of these elements to provide access to POTS, and thus is less expensive to manufacture. In fact, a cellular telephone can retail for several times the price of a basic land-line telephone.

The cost of cellular service is typically exacerbated by the "overhead" expenses incurred by the cellular service provider (CSP). Although cellular service is provided by a CSP, the customer typically purchases the cellular telephone from a retailer, such as an office supply or electronics store. Each cellular telephone must then be activated prior to first use.

In a typical approach, at the point of sale, the retailer collects the customer information that is required for activation. The information collected may include name, address, home telephone number, office telephone number, social security or other identification number, and payment information. The retailer then sends this information to a customer activation center (CAC). The CAC performs a credit check, assigns a cellular telephone number, and relays the cellular telephone number back to the retailer. The retailer then programs the cellular telephone number into the cellular telephone.

Either or both the retailer and the CAC receive a fee for performing or arranging for a cellular telephone number or programming the cellular telephone number into the cellular telephone. Thus, the need for an intermediate business or organization to obtain a cellular telephone number or to program the cellular telephone increases the cost to the customer or decreases the revenue to the CSP.

In another approach, the customer may order the cellular telephone through the mail or may purchase it directly from a retailer that does not perform the activation sequence. When the cellular telephone arrives, the customer must arrange to obtain a cellular telephone number for the cellular telephone and to program the cellular telephone number into the cellular telephone. To do so, the customer may directly call the CAC, either using the cellular telephone or another telephone. If the customer calls using the cellular telephone, the cellular telephone has a dummy Mobile Identification Number (MIN) which permits access to the cellular telephone network. This feature eliminates the need for the services of an intermediate business or organization because the customer communicates directly with the CAC. The CAC performs the credit check and assigns the cellular telephone number to the cellular telephone. The customer then manually programs the cellular telephone number into the cellular telephone, either by using the instruction manual or by listening to instructions from the CAC. In some instances, the cellular telephone is programmed to allow the CAC to remotely program the cellular telephone number into the cellular telephone. The need for the retailer or a service provider to program the cellular telephone is thereby eliminated.

Some customers encounter difficulty in performing the programming because of unfamiliarity with the concept of programming, or because of inadequate instructions in or loss of the instruction manual. In addition, for the CAC to assist the customer in programming the cellular telephone, the customer must be able to tell the CAC the make and, in some instances, the model of the cellular telephone. The make may be obvious if the cellular telephone is sold under the label of the manufacturer, but may not be obvious if the cellular telephone was sold under a private label. The model number, and any revision number, may not be listed or may be difficult to determine without opening the case of the cellular telephone, which may void the warranty. Consequently, a customer may find the self-programming approach somewhat frustrating.

In addition to up-front costs, cellular service may also be impracticable for some customers due to monthly service fees. Cellular service providers must also be responsive to the market demand for lower cellular rates. This demand is evidenced by frequent new and/or special rate plans advertised by various cellular service providers who must compete for customers as the market becomes saturated with cellular users.

Cellular customers typically pay a flat fee for service, and an additional fee based on the number of airtime minutes that the customer has used. Other cellular service plans may require the customer to purchase a bulk quantity of airtime minutes, for which the customer must pay even if the airtime is not actually used. Customers who choose to pay "by the minute" typically receive rates that are less favorable than rates available to those who purchase airtime in bulk. Furthermore, customers who choose to purchase airtime in bulk further reduce per minute rates by purchasing increasingly larger blocks of minutes. However, these bulk purchasers effectively ensure that their cellular telephone bills will never be lower than the minimum quantity of minutes purchased.

Airtime rates also typically vary based upon the time of day and day of the week. CSPs impose different rates at different times as part of the process of "traffic engineering." Traffic engineering involves calculating and controlling the amount and location of communications equipment required to handle communications traffic, including telephone, voice, data, images, and video. Rather than simply installing expensive communications equipment to keep pace with traffic, many CSPs attempt to control expenditures by controlling the traffic. To encourage "peak shifting," CSPs raise the per minute rates for cellular service during peak periods. For instance, weekend rates are lower than weekday rates, and nighttime rates are lower than daytime rates. These rate variations enable the CSPs to increase the efficiency of capital expenditures on infrastructure, such as cell site installations.

Each CSP must statistically determine the times and days that typically experience peak usage, and encourage customers to avoid using cellular service during those periods. Once peak and off-peak intervals are statistically established, the CSP creates rate schedules accordingly, which are then published to the customers of the CSP. The rate schedules typically impose the highest rates during statistically peak periods, which are usually weekday mornings and afternoons. Somewhat lower rates typically apply to statistically more moderate periods, such as weekday evenings. The lowest rates typically apply to statistically non-peak periods, such as weeknights and weekends. Actual usage patterns vary, however, according to any number of parameters, such as the season, local activities (such as major sporting events), holidays, highway traffic conditions, school terms, or the weather. Thus, a disadvantage of such statistics-based rate-making systems is that a CSP's rate schedule may discourage customer usage during a "peak" period that is actually experiencing low call traffic, and may encourage customer usage during an "off-peak" period that is actually experiencing high call traffic. The variability in the correlation between statistical prediction and actual call traffic can result in lost revenues and network overloads. Statistics-based rate schedules are also disadvantageous for customers, who may be unnecessarily discouraged from calling during unfavorable rate periods, which may last for hours.

Thus, there is a need in the telecommunications industry for systems and methods for providing telephone service that is less cost-prohibitive than typical cellular service, and that does not require the infrastructure of POTS.

SUMMARY OF THE INVENTION

Certain aspects and features of the various embodiments of the present invention address the problems described above with a cellular apparatus and service that is significantly less expensive to provide, easier to activate, and less expensive to operate. Reductions in cost are achieved by streamlining the cellular device itself, automating the process of activating and servicing the cellular device, and by providing more accurate and flexible rate plans and signals that enable the customer and the service provider to control the cost of service. These measures reduce the cost of providing cellular service and serve the market demand for lower priced cellular service.

More specifically, one aspect of the present invention is a telephone that includes all of the features necessary to place telephone calls, without certain features that are costly to provide. For instance, in one embodiment, the telephone is a stationary cellular device (SCD). The SCD lacks the unlimited handoff capability that allows ongoing cellular telephone conversations to be passed from any one cell site to any other cell site. Instead, the SCD can only handoff between cell sites in a predefined list of permissible cells. A list of permissible cell sites for a particular SCD is stored locally in a memory in the SCD. Whenever a call is attempted from the SCD, an originating cell identifier and a SCD identifier are cross-referenced in a network database that contains a remote version of the list of permissible cells for that SCD. Alternatively, the originating cell identifier can be compared to the list of cell IDs stored in the memory of the SCD. If the originating cell identifier is in the list of permissible cells for that SCD, the network permits the SCD to place the call. Once a call is connected, the local list of permissible cells determines whether the SCD can handoff to another cell site. The limited handoff feature enables the service provider to control use of system resources, while enabling the user to handoff as needed to place and receive calls in a fixed and predetermined area.

Another aspect of the various embodiments of the invention is a process for activating cellular service. Using an over-the-air activation procedure, a cellular telephone or SCD powers on and places a call to a Customer Activation Center (CAC). The SCD communicates identifying information regarding the SCD and the customer to the CAC, which the CAC uses to authenticate the SCD. The identifying information may include a terminal or device identifier, and user information, such as a social security number or customer ID. The identifying information can be used to validate the provision of service to the user by checking the user's credit, or confirming that the user has subscribed for service. Authentication also involves associating a telephone number with the SCD.

In a process called "orientation," the geographic location of the SCD is determined from data that is provided by the user or from data provided by a geopositioning system, such as a GPS or triangulation system. The CAC "provisions" the SCD by retrieving a list of cell IDs that correspond to that geographic location, thereby identifying cell sites that the SCD has permission to access. The originating cell ID for each subsequent call placed by the SCD is compared to this list of permissible cell IDs, and service is permitted or denied accordingly.

Yet another aspect of various embodiments of the invention includes flexible rate plans and real-time rate signals that benefit the CSP and the customer by providing real-time traffic control. As used herein, the term "traffic" means the amount of activity during a given period of time over a given communications network element, such as a circuit, cell site, trunk, line or group of lines, or communications switch. The CSP can optimize its network by engineering the cellular network specifically for reduced cost cellular service, rather than overcompensating for statistical peaks in call traffic.

Whenever call traffic actually drives network capacity outside of an acceptable range, a CSP can control call traffic by transmitting favorable or prohibitive cost signals, or by delaying or disrupting service to appropriate subscribers. In this manner, aspects of the invention facilitate peak-shifting of customer usage according to actual fluctuations in call traffic.

One aspect of various embodiments of traffic control is monitoring by a Network Control Center (NCC), which can be a mobile switching center (MSC). The Network Control Center monitors traffic at any or all of a plurality of network elements, such as other MSCs, cell sites, or central switching offices. The monitoring data accumulated by the NCC is used to determine whether call traffic control measures should be implemented.

According to this aspect, when the NCC detects that the level of communications traffic at a particular element creates a shortage of capacity, the NCC implements appropriate traffic control measures. For example, if a particular cell site becomes overloaded, calls placed by customers associated with that cell site (and of lower priority) are restricted either actively or passively. To do so, the customers associated with that cell site are identified. If those customers are SCD users, a database query can determine whether the affected cell site is one of the permissible cell sites for those customers. Other users in the affected area can be identified based on the relationship between the proximity of the affected cell site and the users' location, which can be determined for example by querying a Home Location Register, or by GPS, triangulation or other locating means.

In certain embodiments, the traffic control aspect of the invention is implemented by notifying the customer at the instant a low call traffic period is detected by the CSP. The notification includes an indication that lower rates are available during the low call traffic period. The indication can be provided by a visual, audible, or tactile alert means, such as but not limited to a tone emanating from the handset, a text message or icon on a telephone display, an incoming call to the customer, vibration emanating from the handset, voicemail, or an audible broadcast message. The notification may specify a fixed interval during which lower rates are available, or a second notification may cancel the reduced rate period. The customer may take advantage of the offer of lower rates by responding to the notification or by simply placing a call after receiving notification. This aspect of the invention can also be implemented with control plans that provide flexible levels of service—that is, levels of service that vary according to the rates paid by the customer. Flexible service levels can be implemented dynamically, or at initiation of the customer-CSP relationship. For example, the customer may subscribe at a control plan that offers a lower level of service at lower rates than regular control plans. The lower level of service is manifested when, during periods at which call traffic is critically high, the customer's ability to place a call is strictly controlled by the CSP. The customer's call may be blocked altogether, or the call may be delayed until network capacity rises above a predetermined level. The customer's ability to continue an ongoing call may also be controlled, such as by the CSP disrupting a call in progress due to critical call traffic conditions. Although these aspects of the present invention are described in relation to cellular service, the aspects are also applicable to landline applications, such as long distance telephone service, or other wireless applications, such as wireless email, internet, and text paging.

These and other objects, features, and/or advantages accrue from various aspects of embodiments of the present invention.

BRIEF DESCRIPTION OF THE DRAWINGS

The accompanying drawings, which are incorporated in and form a part of the specification, illustrate certain embodiments of the present invention and, together with the description, disclose various features and aspects of the invention. In the drawings:

FIG. 7 is a graphical illustration of yet another control scheme according to an embodiment of the invention.

DETAILED DESCRIPTION OF THE INVENTION

The Stationary Cellular Device (SCD)

Figure 1:
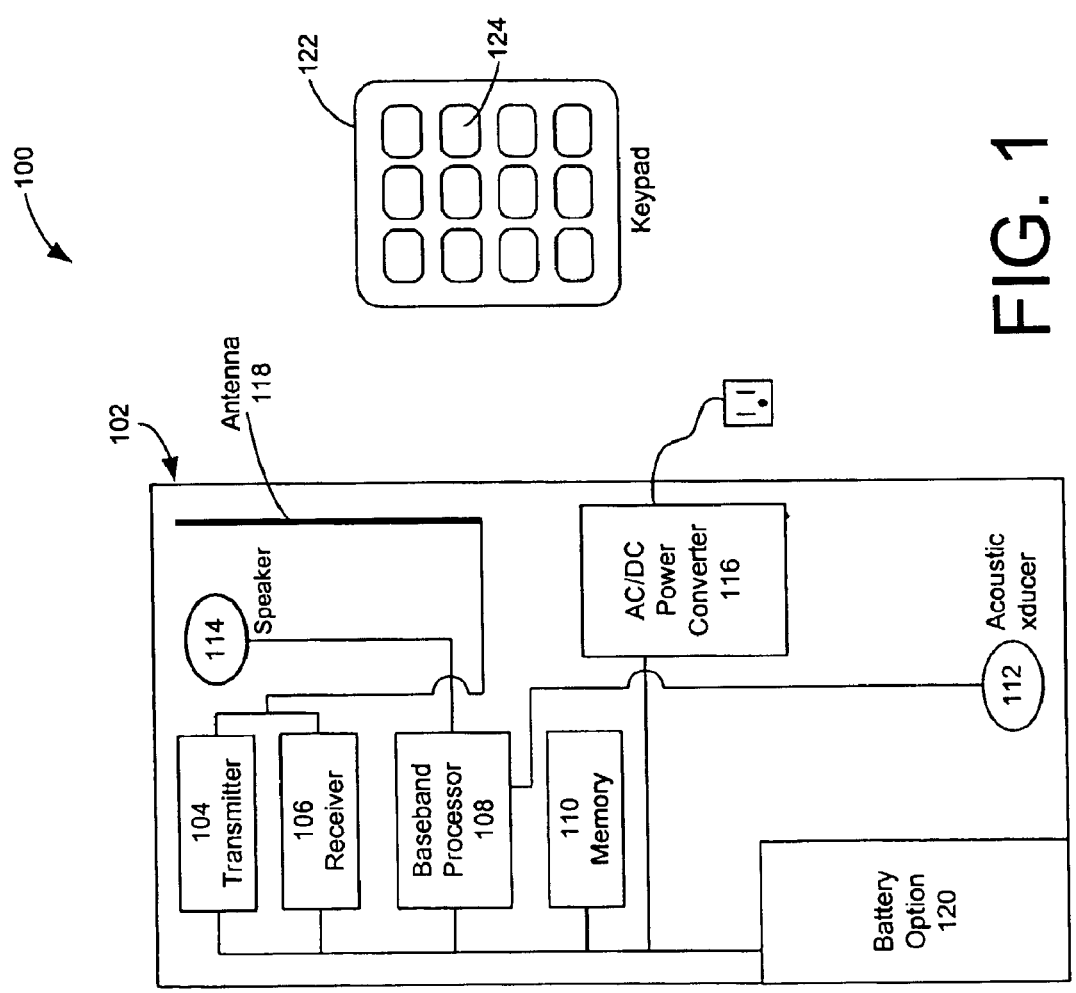
FIG. 1 is a schematic of the stationary cellular device (SCD) according to various embodiments of the invention.

FIG. 1 is a schematic of an exemplary stationary cellular device (SCD) 100. The SCD 100 includes many of the components common to a typical cellular or cordless telephone. The SCD 100 typically includes a handset (not separately shown), including an earpiece and a mouthpiece. Separate from or integrated with the handset, the SCD 100 includes a base 102. The base 102 houses a transmitter 104, a cellular receiver 106, a baseband processor 108, memory 110, an acoustic transducer 112, a speaker 114, an AC/DC power converter 116, an antenna 118, and optionally, a rechargeable or replaceable battery 120. A keypad 122 is integrated with to the base 102, handset, or both. The keypad 122 includes buttons 124 common to telephone keypads, and may optionally include a screen. In "corded" embodiments, the handset of the SCD 100 may be physically connected to the base 102 via a standard telephone handset cord. Alternatively, the SCD 100 may be "cordless" in that the handset communicates with the base 102 wirelessly.

In a first cordless embodiment of the SCD, the base includes two antennae. A first antenna transmits and receives cellular signals to and from one or more cell sites. The term "cell site" refers to a low-powered radio transmitter/receiver that serves one geographic unit of the cellular system. A second antenna transmits and receives radio waves to and from a cordless handset. In a second cordless embodiment, a single base antenna transmits and receives cellular signals to and from cell sites, as well as radio waves to and from the cordless handset. In a third cordless embodiment, the handset and base communicate with one another with extremely low power calls over predetermined cellular channels. In this third cordless embodiment, the CSP reserves a portion of a block of proprietary cellular frequencies for extremely short range communications. Communicating with the base over these reserved frequency channels reduces the potential for interference from nearby conventional cordless or cellular devices.

The SCD is preferably capable of performing a very limited handoff function between selected cell sites that serve the home or fixed environment so that the SCD operates well inside a home or other fixed environment. Without some handoff ability, the cellular receiver could not compensate for fading that occurs when a customer moves from one area to another within the environment, or when the environment itself changes. The cellular device must handoff, for example, when the cellular device leaves the service range of one permissible cell site and enters the service range of another permissible cell site. One cell site may be appropriate for calls made from the front of a home, while another cell site may be appropriate for calls made from the rear of a home. Handoff capability is also required to compensate for fluctuations in cell site capacity and power, and for the reflectivity of radio waves. The limited handoff function does not support unlimited handoff or roaming, however. Limiting handoff or roaming capability can reduce the cost of the device, and enables the SCP to control the utilization of the network.

To limit the handoff function of the SCD, a stationary cellular application within the baseband processor 108 of the SCD compares the cell identifier (cell ID) of one or more accessible cell sites with a list of one or more permissible cell IDs that is preferably stored in the memory 110 of the SCD 100. Thus, the list of permissible cell IDs serves at least two major purposes: the list of permissible cell IDs 1) limits the geographic area from which the customer is permitted to place calls using that particular SCD, and 2) identifies the cell sites within that geographic area between which the SCD may handoff during an ongoing call. The SCD receives a list of permissible cell IDs during the "activation" process, which is described below in more detail. The list of permissible cell IDs is maintained in a network element of the cellular system, but is also preferably stored in the memory element of the SCD. Substantially less memory is required to support the stationary cellular application than is required to support typical cellular phone features, such as caller ID, memory dialing and text paging. Thus, a smaller memory element can be installed in the SCD so the cost of the SCD is less than a typical cellular device. The fixed cellular application maintains the list of permissible cell IDs, and restricts the SCD from handing-off to cell IDs that do not appear in the list of permissible cell IDs for that SCD.

Alternatively, the list of permissible cell IDs can be maintained entirely at the network level. In other words, rather than storing the list of permissible cell IDs in the SCD and controlling handoff using the fixed cellular application, a network level application can control handoff during an ongoing call.

The SCD application preferably searches for and utilizes the permissible cell site that has the strongest signal, as is common in conventional cellular communications standards, but may also search for the closest available permissible cell site. In some geographic areas, the CSP provides "macro cells" and "micro cells." Most often, a macro cell provides service for the bulk of the cellular customers in its service area. If the macro cell is overloaded, then one or more micro cells provides "overflow" capacity to the macro cell by carrying some of the macro cell's calls. At least a limited handoff capability is needed for the SCD to switch from a macro cell to a micro cell.

Activation

As mentioned above, the SCD must be activated before the SCD is used for the first time.

In certain embodiments of the invention, over-the-air activation procedures are used to activate the SCD. An example of such a procedure is described in U.S. Pat. No. 5,887,253, which is incorporated by reference. The process of activation involves the process of authentication, which includes the SCD-specific steps of orientation, and provisioning. The steps do not necessarily have to be executed in a particular order. The activation process preferably also involves several elements of a cellular network. Each element may be a component of one or more physical network devices.

Figure 2:
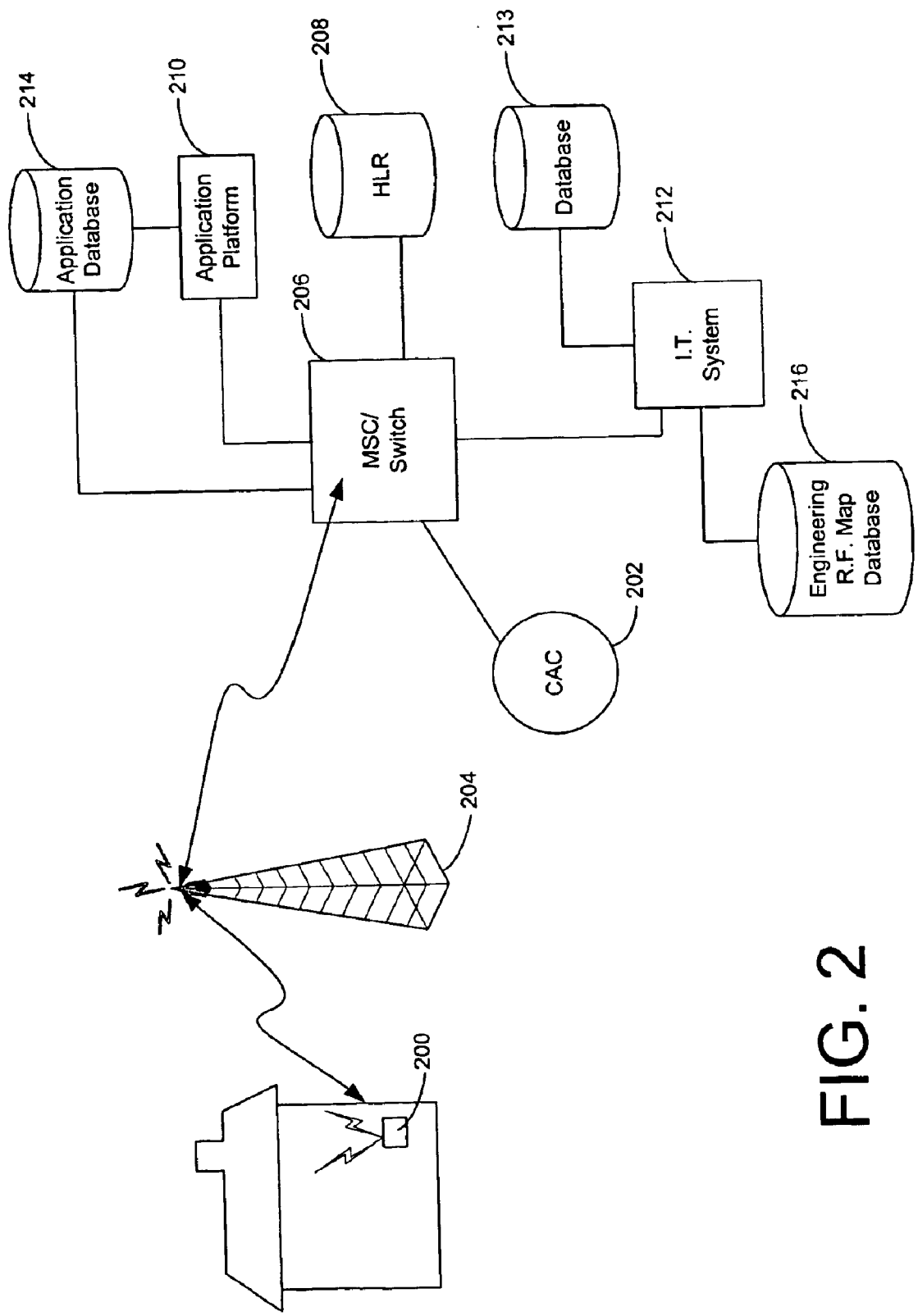
FIG. 2 is a block diagram of an exemplary activation environment of an embodiment of the invention.

FIG. 2 is a block diagram of an exemplary activation environment of an embodiment of the invention. The activation environment preferably includes a CAC 202 and one or more cell sites 204, an MSC 206 or other switching center, and an HLR 208. The CAC 202 may be integrated with the MSC 206, which also contains and/or communicates with an Application Platform 210, an I.T. System 212, an I.T. Database 213, an Application Database 214, and an Engineering Map Database 216.

The activation process begins when the SCD 100 is powered on. Until the SCD 100 is activated, any call attempted is preferably automatically routed to an activation center, such as the CAC 202. The SCD user communicates with the CAC 202 via the most appropriate cell site 204, preferably by placing a telephone call to a dedicated SCD activation telephone number. The SCD activation telephone number is preferably preprogrammed into the SCD 100, or included in the instructions for the SCD 100.

According to an embodiment of the invention, the SCD 100 is "pre-activated," in that identifying information, including a subscriber identifier (ID), is pre-assigned and stored within the SCD 100 prior to purchase by the customer. North American cellular protocol systems, such as the analog AMPS, IS-95 CDMA, and IS-136 TDMA systems, use a telephone number as the subscriber identifier. GSM (Global System for Mobile Communications) countries assign an International Mobile Subscriber Identifier (IMSI), which is distinct from the phone number.

Once the communications session has been initiated, the SCD 100 transmits the identifying information to the CAC 202. The identifying information preferably also includes a terminal (device) identifier (such as an Electronic Serial Number (ESN), or International Mobile Equipment Identifier (IMEI). The terminal ID and subscriber ID are transmitted to a switching center 206, such as a switch or a mobile switching center (MSC). The switching center 206 provides services and coordination between customers in the network and external networks. The switching center 206 shown in FIG. 2 is a mobile switching center (MSC).

The majority of the steps for authenticating service for the SCD 100 occur according to an authentication protocol for mobile and telecommunications networks. If the subscriber ID is not used as the telephone number, the MSC 206 uses the subscriber ID to procure a mobile station integrated services digital network number (MSISDN). The MSISDN is procured from a home location register (HLR) 208. Authentication may include verification of customer identity and credit worthiness, exchange of payment information, and validation of the integrity of the device.

The authentication procedure for an SCD 100 includes an additional sequence, in which the MSC 206 triggers invocation of an Authentication Application. The Authentication Application supplants unnecessary processes in standard authentication protocols with the SCD-specific authentication processes (orientation and provisioning) controlled by an Application Platform 210.

In the HLR 208, a record exists for every service available to the SCD 100, including call features. In the environment shown, the HLR 208 is populated by the IT System 212, which retrieves data from an IT Database 213. The HLR 208 also recognizes a set of conditions as triggers such as terminating triggers, originating call triggers, and authentication triggers. A trigger is invoked in response a request to add, change, delete, or retrieve an associated data element. Each trigger corresponds to an application resident on the Application Platform 210.

In certain embodiments, the HLR recognizes receipt of identifying information as an authentication trigger. The authentication trigger causes the HLR 208 to instruct the MSC 206 to send the subscriber ID, terminal ID, and MSISDN (if applicable) to the Application Platform 210. The Application Platform 210 runs the Authentication Application (not shown), which performs orientation and provisioning functions. The Application Platform 210 queries an Application Database 214 that contains at least a subset of all existing cell IDs. The Authentication Application selects from the Application Database 214 a list of permissible cell IDs for that SCD 100, based on the geographic location of the SCD (as determined in the orientation process). In the provisioning process, the list of permissible cell IDs is communicated back to the SCD 100. Each time the customer subsequently originates a call using that SCD 100, the HLR 208 again instructs the MSC 206 to send the identifying information to the Application Platform 210. The originating trigger invokes an "originating call" application that determines whether the originating cell ID (i.e., the cell ID associated with the geographic origin of the call) is in the list of permissible cell IDs for that SCD 100. If the originating cell ID is in the list of permissible cell IDs, the Application Platform informs the MSC 206, which then provides service authorization so that the customer may complete the call. If the originating cell ID is not in the list of permissible cell IDs, then the MSC 206 is directed to deny service, and the Authentication Application determines whether the SCD 100 has permission to be re-activated.

Provisioning (i.e., limiting authorization of an originated call to a predetermined list of permissible cell IDs) prevents the SCD 100 from being used outside of a designated area, defined by a location ID. The Application Platform 210 determines which of all existing cell IDs are permissible by comparing the geographic location of the SCD 100 at the time the customer initiates the activation sequence with a set of associated cell IDs. The geographic location is located in the functional equivalent of a look-up table containing cell IDs and the geographic areas served by the cell sites associated with the cell IDs. The list of permissible cell IDs is preferably transmitted to the SCD 100 via a programmable short message, or "SMS" (Short Message Service).

In the orientation process, the geographic location is determined, preferably using a global positioning system (GPS). For instance, CSPs typically maintain an engineering radio frequency map database (ERFMD) 216. An ERFMD 216 is part of a software application that predicts and empirically assesses cellular signal strength by analyzing the power output and frequency channels of cell sites in view of the terrain of the surrounding area. Cell IDs for those cell sites that are capable of serving the associated geographic area are then mapped to postal addresses, latitudes, and longitudes. The ERFMD 216 assists system engineers in optimizing placement of cell sites, and to "tune" the network to control the quality of cellular service.

Alternatively, the geographic location can be determined using triangulation based upon the signal received from the SCD. Three or more cell sites in the vicinity of the SCD According to certain embodiments of the invention, the functional equivalent of an ERFMD 216 is utilized to identify the cell IDs that should be included in the list of permissible cell IDs for a given SCD 100. The functional equivalent of a relatively inexpensive GPS receiver is integrated into the SCD 100. The GPS receiver determines the location ID by calculating the precise position of the SCD 100. A corresponding list of cell IDs is retrieved from the ERFMD 216. The SCD 100 preferably communicates its position to the MSC 206, which transmits the position to the ERFMD 216 during the over-the-air activation procedure, although other modes of communication can be employed.

System design rules control assignment of cell IDs to a given SCD 100. For instances, an SCD 100 can be associated with a certain number of cell IDs, cell IDs within a geographic radius, or cell IDs with a minimum amount of available capacity.

In an alternative embodiment, the geographic location is determined based upon customer input at the time of activation. For instance, the activation sequence may prompt the customer to indicate his or her location using interactive voice response (IVR) and/or touchtone inputs. The customer's inputs are translated into a location ID. The customer's billing and other demographic data can also be obtained during activation, using the same input methods.

In yet another embodiment, the geographic location is determined based on the RF (radio frequency) signal received from the SCD by surrounding cell sites. Each of the surrounding cell sites detects the strength of the signal emitted by the SCD, and the original transmit power level from the SCD. The signal strength and transmit power level are used to determine the bit error rate of the signal. Each of the surrounding cell sites sends the bit error rate information associated with the SCD to the Application Platform, which determines the location of the SCD using a location algorithm.

After initial activation of the SCD 100, the ability of a customer to change the location ID, and thus, the permissible list of cell IDs is controlled using a flexible rule set. The flexible rule set prohibits changes, for example, during a given timeframe or of a given degree, or imposes a financial disincentive upon the customer. This control is necessary to prevent the customer from circumventing the limited handoff function of the SCD 100 by repeating the activation procedure each time the customer changes geographic locations. The flexibility of the rule set permits the customer to rectify inadvertent errors committed during the activation procedure.

The authentication process occurs each time the SCD is powered on. The orientation process should only occur if no list of permissible cell IDs has been established, if the originating cell ID is not in the list of permissible cell IDs, and if permission is granted through the authentication process to "re-orient." The provisioning process should only occur in limited circumstances, such as the first time the SCD is powered on, when permissible cell IDs are added or removed at the network level, or when the customer moves or transfers ownership of the SCD. Re-orientation can be permitted when the SCD "permanently" moves from one geographic location to another. For example, the customer may be required to periodically "re-provision" the SCD, so that the list of permissible cell IDs stored in the memory of the SCD is updated with any new cell IDs that have been associated with the customer's location ID. The flexible rule set discourages re-provisioning if the change in geographic location is temporary.

Operation

Figure 4:
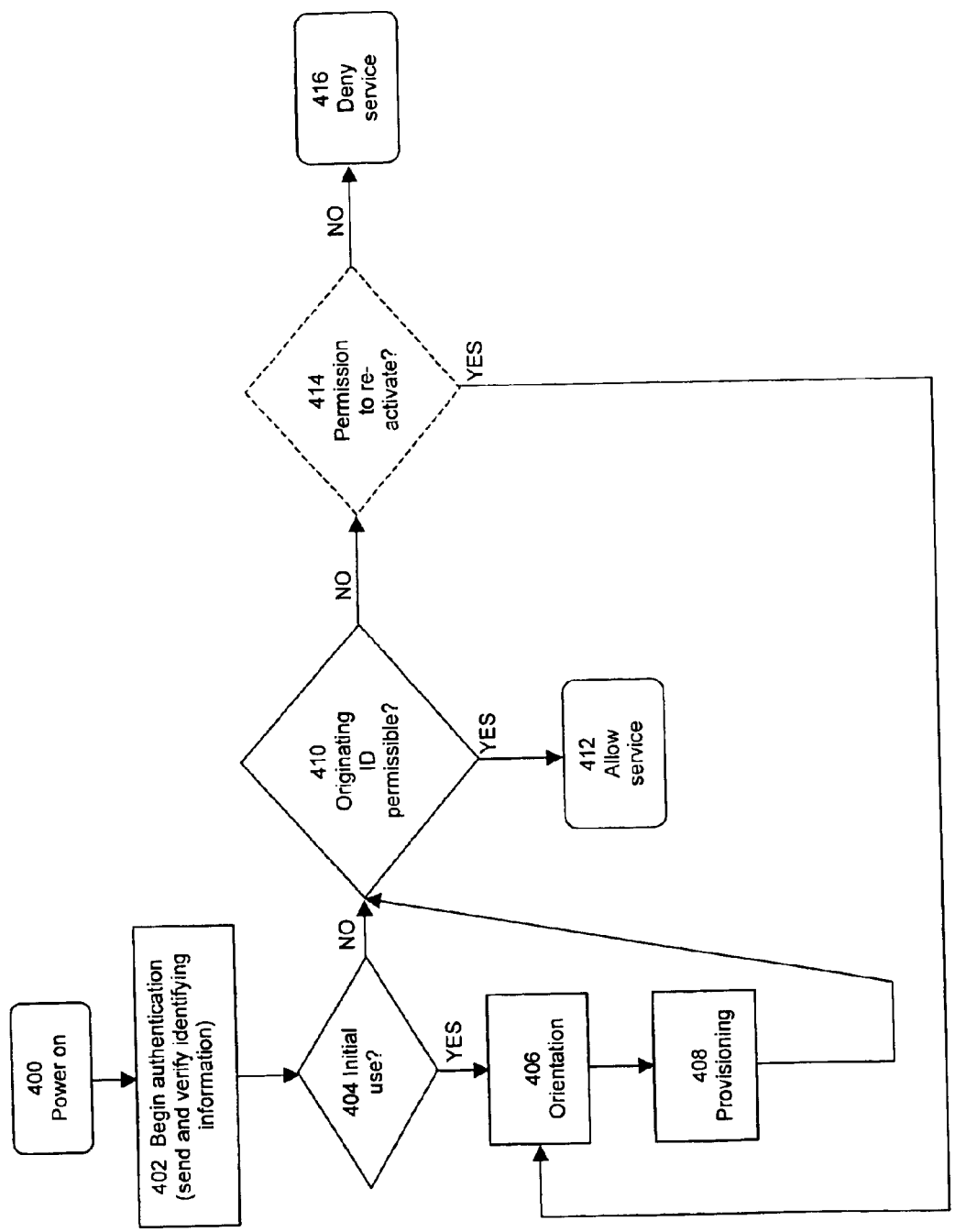
FIG. 4 is a flowchart of the operation of the stationary cellular device, according to an embodiment of the invention.

FIG. 4 is a flowchart of the operation of the stationary cellular device 100, according to an embodiment of the invention. At 400, the SCD is powered on. At 402, identifying information is sent from the SCD to the MSC. At 404, either the MSC or the SCD determines whether the SCD has been activated. This determination can be made by any number of appropriate mechanisms, such as checking for an initialization flag stored in the memory of the SCD or in the Application Database, or by determining whether a set of permissible cell IDs has previously been downloaded to the SCD. If the SCD has not been activated, the orientation and provisioning processes of authentication, described herein, are performed at 406 and 408. If the SCD has been previously activated, at 410, the originating cell ID of the attempted call is checked against the set of permissible cell IDs for that SCD at least in part to ensure that the customer is calling from an originating cell ID that corresponds to a cell ID in the customer's list of permissible cell IDs.

In certain embodiments of the invention, this "originating call ID check" occurs within the SCD. In these embodiments, the SCD receives the originating cell ID from the originating cell site or from the MSC. An application stored within the SCD then compares the originating ID to the list of permissible cell IDs stored within the SCD. If the originating cell ID is in the list of permissible cell IDs, the SCD sends an authentication indicator (such as a flag) to the MSC. The authentication indicator indicates that the call is allowable, and enables the MSC, at 412, to route the call to its intended recipient. If the originating ID is not in the list of permissible cell IDs, then in these embodiments, operation proceeds from 410 to 416 and the SCD terminates the attempted call (414 is not applicable).

In other embodiments, the originating call ID check occurs at the network level. Upon attempting a call, the SCD communicates identifying information to the MSC, which causes the Application Platform to compare the originating cell ID to the list of permissible cell IDs, which can be obtained from the Application Database based on the terminal ID of the SCD. If the originating cell ID is not in the list of permissible cell IDs, then at 414, the Authentication Application determines whether re-activation is permissible, according to flexible rules imposed by the CSP. The flexible rules may allow re-activation at set intervals, upon payment of a fee, or when the customer has made arrangements with the CSP to re-activate the SCD. If re-activation is not permissible, then at 416, the MSC terminates the attempted call.

Once a call is connected, the SCD application uses the list of permissible cell IDs stored within the SCD to determine permissible handoff cell sites.

Call Traffic Control

Figure 3:
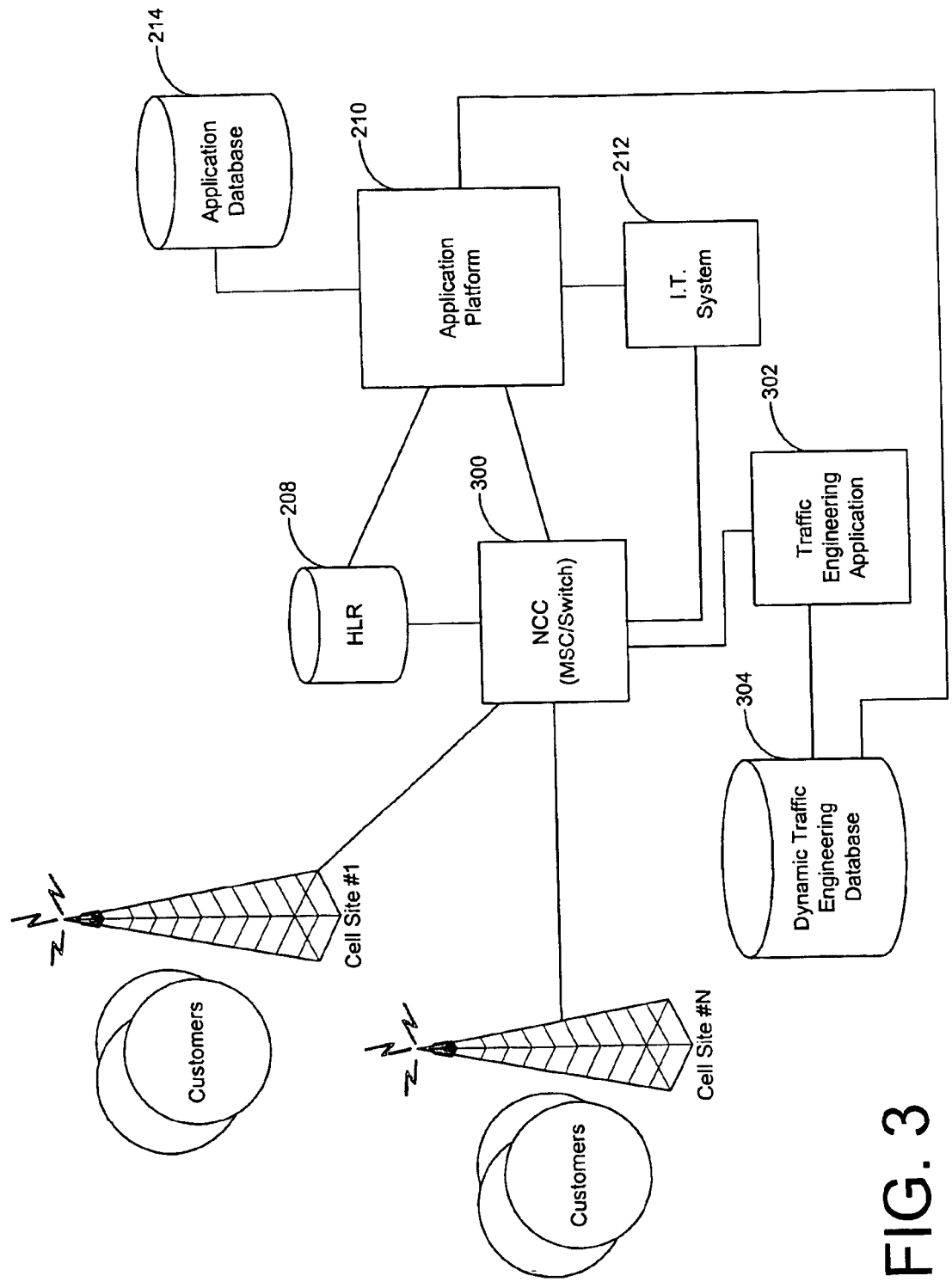
FIG. 3 is a block diagram of an exemplary call traffic control environment according to an embodiment of the invention.

To further reduce customer and provider costs associated with cellular service, systems and methods for providing real-time call traffic control are provided. According to certain embodiments of the invention, upon attempting to place a call, customer identification information is communicated to the MSC 206. The subscriber ID or other identifying information preferably indicates the control plan to which the customer subscribes. The customer's control plan dictates the control measures that the customer has typically agreed to accept in exchange for lower rates. Referring to FIG. 3, each cellular network has a Network Control Center (NCC) 300, which can be an MSC 206 (or the functional equivalent). Occupancy data is relayed to the NCC 300. The occupancy data indicates the traffic offered and carried at various levels of communications network elements or sub-elements. In a cellular network, these network elements are "cellular facilities," which can include individual or groups of cell sites, MSCs, or RF channels. In a landline system, the network elements include POTS facilities such as central offices and trunks. For example, the occupancy data at each MSC 206, cell site 204, and RF channel in each cell site on the cellular network can be communicated to the NCC 300. An algorithm at the NCC 300 translates the occupancy data into traffic intensity, which is typically a measure of the average occupancy of the particular network element which is to carry the call. Traffic intensity is preferably expressed using an Erlang formula, such as the Erlang B probability of blocking $P_b$:

$$P_b = \frac{E^N/N!}{\sum_{k=0}^{N} E^k/K!}$$

where:
  E (traffic intensity)=$\lambda$ $t_h$ Erlangs,
  $\lambda$=call arrival rate (calls/hour),
  $t_h$=mean holding time (hours/call), and
  N=total number of channels.

A traffic intensity of one Erlang means the cell site has been continuously occupied during the time period under consideration. Traffic intensity can be calculated using any effective mathematical expression, such as Erlang C, centum call seconds (CCS), or capacity factor.

The NCC 300 passes the traffic intensity data to a Traffic Engineering Application 302, which processes the traffic intensity data to monitor the traffic on the cellular network. The Traffic Engineering Application 302 populates a Traffic Engineering Database 304 with data that quantifies the traffic level seen by the NCC 300. One appropriate metric is the probability of blocking $P_b$ for each cell site, by cell ID, and by MSC 206. Traffic intensity data from multiple NCCs 300 can be processed and stored in the Traffic Engineering Database 304.

The CSP launches a Traffic Control Application from the Application Platform 210. The Traffic Control Application extracts data from the Traffic Engineering Database 304, preferably in real time. Based on the traffic intensity (also known as the Grade of Service), the Traffic Control Application then applies a set of rules to determine whether traffic control measures should be implemented in a particular geographic area.

According to various aspects of certain embodiments of the invention, if the probability of blocking $P_b$ indicates a shortage of capacity on a cell or group of cells, then the Traffic Control Application queries the HLR 208 and retrieves a list of affected cellular devices that are in the affected area and associated with subscriber IDs that are to be controlled. The Traffic Control Application instructs the affected MSC 206 and the HLR 208 to implement the appropriate passive or active control scheme until the traffic intensity condition improves. In addition, the Traffic Control Application notifies the IT System 212 of the commencement of a control period for those particular customers. This notification is communicated to a billing application so the prices charged to the customers correspond to the control scheme that is implemented.

Figure 5:
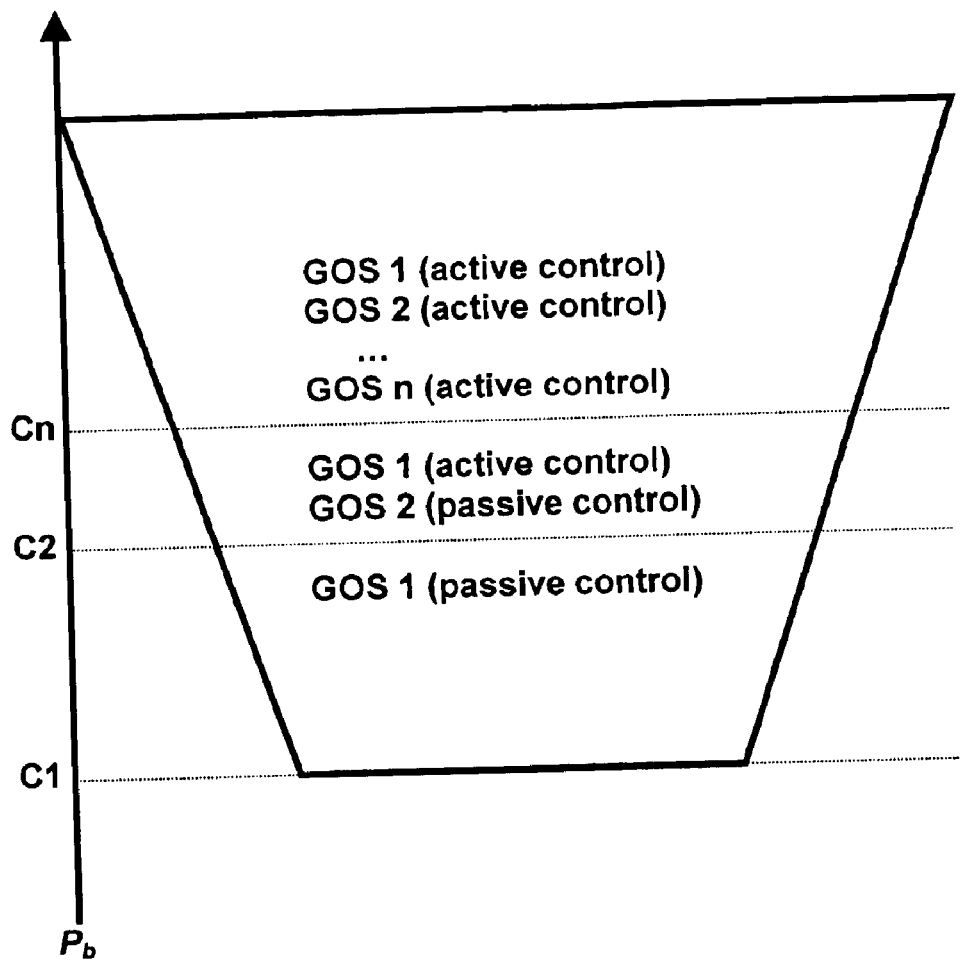
FIG. 5 is a graphical illustration of a control scheme according to an embodiment of the invention.

According to various embodiments of control schemes of the present invention, each customer subscribes to a control plan associated with a grade of service (GOS). As an example, customers subscribing at the most permissive grade of service (GOS0) may never be controlled, that is, purposefully discouraged or prevented from placing calls. However, all other grades of service are subject to varying degrees of control as the network becomes more congested. Typically, the grades of service that are subject to more control are more affordable. FIG. 5 shows the relationship between affected customers and network congestion, according to one such control scheme. In one embodiment, a first control point C1 is reached when the probability of blocking $P_b$ exceeds a certain value, such as 0.5, which indicates that the cell site is 50% occupied. A second control point C2 is reached when the probability of blocking $P_b$ exceeds higher value, such as 0.65, which indicates that the cell site is 65% occupied. An nth control point Cn is reached when the probability of blocking $P_b$ exceeds a predefined absolute maximum n. Both the probability of blocking that defines each control point and the number of control points are variable according to the CSP's requirements at the time control is implemented. The values of $P_b$ in the examples are given to illustrate the use of multiple control points, and not to establish preferences as to particular control schemes or number of control points.

At control point C1, the CSP either passively or actively controls the traffic of calls placed by customers subscribing to a control plan that corresponds to that grade of service. These customers will be referred to as "GOS1" customers, because at control point C1, customers subscribing to control plans that fall within grade of service 1 will be controlled for the first time. At control point C2, the CSP either passively or actively controls the traffic of calls of GOS2 customers. In addition, at control point C2, the CSP continues to control GOS1 customers, and may increase the severity of the control, such as by switching from passive to active control. At control point Pn, the CSP may elect to actively control the traffic of calls placed by all customers subscribing to any reduced cost control plan.

Control points can be established and implemented system wide, or can vary by cell site, geographic area, season, time of day, or other parameter. In other words, the CSP can determine that a 5% probability of blocking $P_b$ is acceptable on weekends, but not on weekdays.

Certain embodiments of the invention implement active control of call traffic by limiting or denying some customers' access of the network during periods of increased call traffic. In an example of an active control scheme according to these embodiments, if the probability of blocking $P_b$ at a given cell site has reached control point C1, then the number and/or duration of calls placed by GOS1 customers in that area can be limited to predetermined maximum values. If the congestion on the network causes the probability of blocking $P_b$ to reach control point C2, GOS1 customers are denied service altogether, and GOS2 customers are prevented from exceeding maximums for number and/or duration of calls placed during the period of control. As an alternative to denying service, the CSP may delay the connection of calls placed by certain customers to prevent those customers from having to attempt the calls repeatedly. Rather, the CSP can generate an audible message that informs the customer that a call will be connected at a later time. Preferably, the customer may accept the delay, or cancel the attempt.

In an active control scheme, the CSP can elect to interrupt service to or limit the duration of calls that were underway prior to the commencement of a call traffic control period. To mitigate the impact on customer service, the CSP can notify the customer of an imminent service disruption using any of the notification methods described hereinafter. After notification is given, the customer has sufficient time to conclude the ongoing telephone call before the call is disconnected.

Other embodiments of the invention implement passive control of call traffic by dynamically establishing rates according to the grade of service that corresponds to the customer's control plan. For instance, if at time t, the Traffic Control Application determines that the probability of blocking $P_b$ at a given cell site has reached control point C1, GOS1 customers in that area must pay an increased rate to place a call. The degree of this dynamic rate increase is calculated to achieve the desired effect of discouraging a given percentage of affected GOS1 customers from placing calls during the period that the increased rate is applicable. To reduce call traffic, the affected customers are notified at the same time as the rate increase is dynamically imposed. After the probability of call blocking $P_b$ falls below control point C1, signaling that the decrease in call traffic has in fact occurred, the rate increase is reversed. GOS1 customers are similarly informed that the period of increased rates has ended or will end at a given time, or when the desired effect has been obtained.

Figure 6:
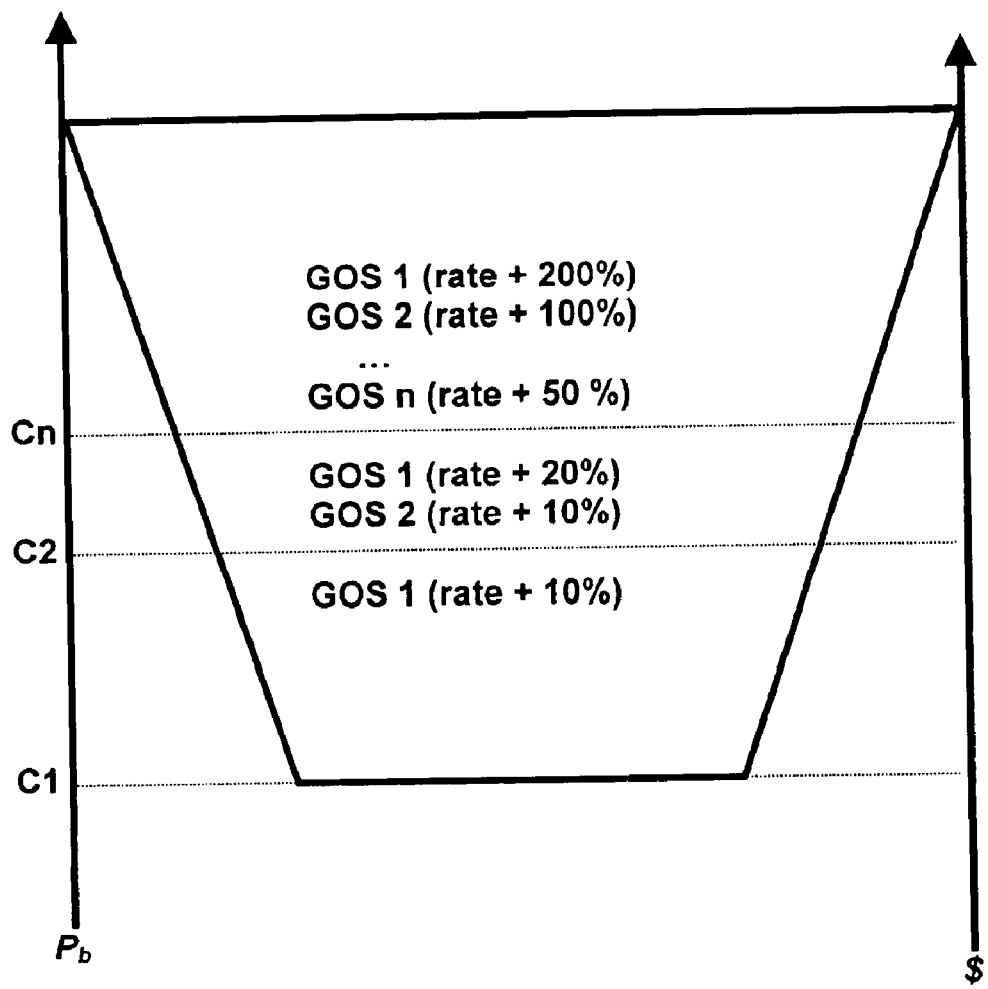
FIG. 6 is a graphical illustration of another control scheme according to an embodiment of the invention.

FIG. 6 is a diagram of a passive control scheme, where increasing premiums are added to the rates of particular tiers of customers as capacity conditions erode. In the example shown, an initial 10% premium is imposed on GOS1 customers when the probability of blocking $P_b$ reaches control point C1. GOS2 customers are unaffected at control point C1. At control point C2, GOS1 customers incur an additional 10% premium (for a total of 20%), while an initial 10% premium is imposed on GOS2 customers. Both GOS1 customers and GOS2 customers are notified of the applicable rate increases that apply at control point C2. Preferably, when the system capacity has reached a critical shortage condition at control point Pn, the applicable premiums are sufficient to effectively preclude call traffic attributable to customers at the lowest grades of service.

Conversely, passive control can be implemented to encourage increases in call traffic during periods of excess capacity. In this instance, increased call traffic is desirable to generate additional revenue, to optimize network utilization, and to allow customers opportunities to place more affordable discretionary calls. To increase call traffic, the customer is notified that rate discounts will be implemented for a period of time. At the end of the discount period, the customer will be notified that the discount no longer applies. Referring to FIG. 7, if the probability of blocking $P_b$ at one or more given cell sites falls below a given discount point D1, some or all of the customers in the affected area are offered a discounted rate for calls. A discount point defines the traffic intensity level at which the CSP offers a discount. The discount is applicable for a fixed period of time, or expires when the probability of blocking $P_b$ rises above D1. The discount may be implemented as a percentage reduction in rates, or as a pre-determined flat rate (e.g., 5 cents per minute). As the capacity surplus increases, the discount increases. For instance, at D1, customers may receive a 50% rate reduction. If the probability of blocking $P_b$ falls further to D2, customers may receive a 75% rate reduction. In any case, the degree of the dynamic rate discount is calculated to achieve the desired effect of encouraging customers to place more calls during the period that the discount is applicable.

Various aspects of the embodiments of traffic control schemes can be implemented in non-cellular applications, especially with respect to long distance service. For non-cellular systems, the NCC determines traffic parameters by monitoring loads on various network switches, network trunks between switches, distribution trunks from switches to end customers, network distribution points, and at network control points. Customers can be notified of load-based variations in pricing using one-way or two-way pagers, distinctive stutter dial tones, distinctive ringing, voicemail, outbound calls from an IVR, email, instant messaging, or any combination of these notification mechanisms.

Notification of the Commencement or Conclusion of Traffic Control

Customer notification of the increased or reduced calling rates is preferably performed by sending a commencement message when the adjustment period begins, followed by a concluding message when the adjustment period ends. Notification can be accomplished with an SMS message to the customer's handset. If the handset has no display, the customer can receive notification via a tone or beep, similar to the audible alert commonly used to indicate that a cellular customer has a voice message. If the handset has a display, notification can be received as a text message along with or in lieu of the audible tone. The text message includes a short description of the rate adjustment, such as "10% off all calls now" or "reduced rate ends in 2 minutes." An icon or other graphic can communicate the same information. For example, "$" can indicate a 10% rate increase, "$$$" can indicate a 30% rate increase, and "–$$" can indicate a 20% rate reduction. Similarly, audible tones with different pitches can differentiate between an increase as opposed to a discount; the number of tones can indicate the amount of the adjustment. Alternatively, a particular melody or a prerecorded message can designate commencement or conclusion of a period of rate adjustment.

Rather than using an SMS message for notification of commencement or conclusion of a period of rate adjustment, a call can be placed to each affected customer. When the customer answers the call, notification is provided via a prerecorded message. This alternative is less attractive for providing notification of temporary rate increases due to capacity shortages, because the notification calls would further increase the already elevated call traffic on the affected portion of the network.

The foregoing description of a preferred embodiments of the invention has been presented only for the purpose of illustration and description and is not intended to be exhaustive or to limit the invention to the precise forms disclosed. Many modifications and variations are possible in light of the above teaching. For example, the notification and control aspects of the invention are directed to cellular service, but can be implemented in any subscriber media, such as POTS, text paging, wireless internet, long-distance, cable, satellite, and internet services. The term "call" includes any communications session initiated or received in any such subscriber medium. In addition, passive or active control of call traffic can be implemented proactively or reactively. For example, a control scheme can be implemented reactively by calculating the probability of blocking $P_b$ on a given cell site only in response to an attempted call, and then by imposing rate adjustments or denying service to that particular customer if warranted by the capacity situation at that particular time.

Various modifications are possible, including additions, changes, deletions as are suited to the particular use contemplated, without departing from the principles and scope of the invention.

What is claimed is:

1. A traffic control system for controlling traffic on a communications network, the system comprising:
   a network control center that receives traffic data associated with at least one element of the communications network, and relays the traffic data to a traffic engineering database;
   a traffic engineering database that stores the traffic data; and
   a traffic control application that, for each of the network elements:
      extracts traffic data corresponding to the network element from the traffic engineering database;
      determines a traffic control measure to be imposed in a geographic location associated with the network element, based upon the traffic data corresponding to the network element wherein the traffic control measure includes:
         altering a cost of placing calls from communications devices associated with a subscriber identifier to be controlled and the geographic location; and
         preventing each of the communications devices from exceeding maximums for at least one of a number of calls placed or a duration of calls placed; and
      retrieves a list containing each communications device associated with a subscriber identifier to be controlled and the geographic location, wherein each subscriber identifier associated with a communications device indicates a degree of control the traffic control measure exerts on that communications device.

2. The system of claim 1, wherein the traffic control application further implements the traffic control measure with respect to the communications devices retrieved on the list.

3. The system of claim 1, wherein the traffic data indicates that a traffic intensity at the network element is outside of a predetermined range.

4. The system of claim 2, wherein the network control center sends a message to the communications devices when the traffic control measure is implemented.

5. The system of claim 2, wherein the network control center sends a message to the communications devices when the traffic control measure is terminated.

6. The system of claim 4 or 5, wherein the message is an SMS message.

7. The system of claim 4 or 5, wherein the message is a call.

8. The system of claim 4 or 5, wherein the message causes the communications devices to vibrate.

9. The system of claim 4 or 5, wherein the message causes the communications devices to emit a tone.

10. The system of claim 1, wherein at least one of the communications devices is a telephone.

11. The system of claim 1, wherein at least one of the communications devices is a wireless device.

12. The system of claim 1, wherein at least one of the communications devices is a stationary cellular device.

13. A method for implementing rates based on traffic on a communications network, comprising:
   monitoring traffic intensity of a plurality of network elements;
   if the traffic intensity at a selected network element is outside a predetermined range, retrieving a list of affected communications devices wherein the affected communications devices comprise all communications devices that are associated with the network element; and
   implementing a traffic control measure according to a control plan associated with each affected communications device wherein the control plan varies among the affected communications devices according to a degree of control exerted by the traffic control measure on each affected communications device;
   wherein the traffic control measure includes preventing each of the affected communications devices from exceeding maximums for at least one of a number of calls placed or a duration of calls placed.

14. The method of claim 13, wherein the traffic control measure further includes altering a cost of placing a call from each of the affected communications devices.

15. The method of claim 13, further comprising sending a message to each of the affected communications devices to indicate that the traffic control measure is in effect.

16. The method of claim 15, wherein sending the message comprises sending an SMS message to each of the affected communications devices.

17. The method of claim 15, wherein sending the message comprises placing a call.

18. The method of claim 15, wherein sending the message comprises causing the affected communications devices to vibrate.

19. The method of claim 15, wherein sending the message comprises causing the affected communications devices to emit a tone.

20. A traffic control system for controlling traffic on a communications network, the system comprising:
   a network control center that receives traffic data associated with at least one element of the communications network, and relays the traffic data to a traffic engineering database;
   a traffic engineering database that stores the traffic data; and
   a traffic control application that, for each of the network elements:
      extracts traffic data corresponding to the network element from the traffic engineering database;
      determines at least one traffic control measure to be imposed in a geographic location associated with the network element, based upon the traffic data corresponding to the network element wherein the traffic control measure includes preventing each of the affected communications devices from exceeding maximums for at least one of a number of calls placed or a duration of calls placed;
      retrieves a list of the affected communications devices wherein the affected communications devices comprise each communication device associated with a subscriber identifier to be controlled and associated with the geographic location, and wherein the subscriber identifier associated with each affected communications device indicates a degree of control the traffic control measure exerts on that affected communications device; and
      implements the traffic control measure with respect to the affected communications devices.

21. A traffic control system for controlling traffic on a communications network, the system comprising:
   a network control center that receives traffic data associated with at least one element of the communications network, and relays the traffic data to a traffic engineering database;
   a traffic engineering database that stores the traffic data; and
   a traffic control application that, for each of the network elements:
      extracts traffic data corresponding to the network element from the traffic engineering database;
      determines at least one traffic control measure to be imposed in a geographic location associated with the network element, based upon the traffic data corresponding to the network element;
      retrieves a list of affected communications devices wherein the affected communications devices comprise each communication device associated with a subscriber identifier to be controlled and associated with the geographic location, and wherein the subscriber identifier associated with each affected communications device indicates a degree of control the traffic control measure exerts on that affected communications device; and
      implements the traffic control measure with respect to the affected communications devices wherein the traffic control measure prevents the affected communications devices from placing calls.

22. A traffic control system for controlling traffic on a communications network, the system comprising:
   a network control center that receives traffic data associated with at least one element of the communications network, and relays the traffic data to a traffic engineering database;
   a traffic engineering database that stores the traffic data; and
   a traffic control application that, for each of the network elements:
      extracts traffic data corresponding o the network element from the traffic engineering database;
      determines at least one traffic control measure to be imposed in a geographic location associated with the network element, based upon the traffic data corresponding to the network element;
      retrieves a list of affected communications devices wherein the affected communications devices comprise each communication device associated with a subscriber identifier to be controlled and associated with the geographic location, and wherein the subscriber identifier associated with each affected communications device indicates a degree of control the traffic control measure exerts on that affected communications device; and
      implements the traffic control measure with respect to the affected communications devices wherein the traffic control measure alters a cost of placing calls from the affected communications devices and prevents each of the affected communications devices from exceeding maximums for at least one of a number of calls placed or a duration of calls placed.

23. A traffic control system for controlling traffic on a communications network, the system comprising:
   a network control center that receives traffic data associated with at least one element of the communications network, and relays the traffic data to a traffic engineering database;
   a traffic engineering database that stores the traffic data; and
   a traffic control application that, for each of the network elements:
      extracts traffic data corresponding to the network element from the traffic engineering database; and
      determines at least one traffic control measure to be imposed in a geographic location associated with the network element, based upon the traffic data corresponding to the network element;
      retrieves a list of affected communications devices wherein the affected communications devices comprise each communication device associated with a subscriber identifier to be controlled and associated with the geographic location, and wherein the subscriber identifier associated with each affected communications device indicates a degree of control the traffic control measure exerts on that affected communications device; and implements the traffic control measure with respect to the affected communications devices wherein the traffic control measure prevents each of the affected communications devices from exceeding maximums for at least one of a number of calls placed or a duration of calls placed and wherein the network control center sends a message to the affected communications devices when the traffic control measure is implemented.

24. A traffic control system for controlling traffic on a communications network, the system comprising:

a network control center that receives traffic data associated with at least one element of the communications network, and relays the traffic data to a traffic engineering database;

a traffic engineering database that stores the traffic data; and a traffic control application that, for each of the network elements:

extracts traffic data corresponding to the network element from the traffic engineering database;

determines at least one traffic control measure to be imposed in a geographic location associated with the network element, based upon the traffic data corresponding to the network element;

retrieves a list of affected communications devices wherein the affected communications devices comprise each communication device associated with a subscriber identifier to be controlled and associated with the geographic location, and wherein the subscriber identifier associated with each affected communications device indicates a degree of control the traffic control measure exerts on that affected communications device; and implements the traffic control measure with respect to the affected communications devices wherein the traffic control measure prevents each of the affected communications devices from exceeding maximums for at least one of a number of calls placed or a duration of calls placed and wherein the network control center sends a message to the affected communications devices when the traffic control measure is terminated.

25. A traffic control system for controlling traffic on a cellular network, the system comprising:

a plurality of cellular facilities;

a network control center that:

receives occupancy data associated with each cellular facility;

determines traffic intensity at each cellular facility; and relays the traffic intensity to a traffic engineering database;

a traffic engineering database that stores traffic intensity; and a traffic control application that:

extracts the traffic intensity corresponding to a selected cellular facility from the traffic engineering database;

determines at least one traffic control measure to be imposed in a geographic location associated with the selected cellular facility, based upon the traffic intensity corresponding to the selected cellular facility;

retrieves a list of affected cellular devices wherein the affected cellular devices include all cellular devices having a subscriber identifier to be controlled and associated with the geographic location associated with the selected cellular facility; and implements the traffic control measure with respect to the affected cellular devices wherein the traffic control measure prevents each of the affected cellular devices from exceeding maximums for at least one of a number of calls placed or a duration of calls placed.

26. A traffic control system for controlling traffic on a cellular network, the system comprising:

a plurality of cellular facilities;

a network control center that:

receives occupancy data associated with each cellular facility;

determines traffic intensity at each cellular facility; and relays the traffic intensity to a traffic engineering database;

a traffic engineering database that stores traffic intensity; and a traffic control application that:

extracts the traffic intensity corresponding to a selected cellular facility from the traffic engineering database;

determines at least one traffic control measure to be imposed in a geographic location associated with the selected cellular facility, based upon the traffic intensity corresponding to the selected cellular facility;

retrieves a list of affected cellular devices wherein the affected cellular devices include all cellular devices having a subscriber identifier to be controlled and associated with the geographic location associated with the selected cellular facility; and implements the traffic control measure with respect to the affected cellular devices wherein the traffic control measure prevents the affected cellular devices from placing calls.

27. A traffic control system for controlling traffic on a cellular network, the system comprising:

a plurality of cellular facilities;

a network control center that:

receives occupancy data associated with each cellular facility;

determines traffic intensity at each cellular facility; and relays the traffic intensity to a traffic engineering database;

a traffic engineering database that stores traffic intensity; and a traffic control application that:

extracts the traffic intensity corresponding to a selected cellular facility from the traffic engineering database;

determines at least one traffic control measure to be imposed in a geographic location associated with the selected cellular facility, based upon the traffic intensity corresponding to the selected cellular facility;

retrieves a list of affected cellular devices wherein the affected cellular devices include all cellular devices having a subscriber identifier to be controlled and associated with the geographic location associated with the selected cellular facility; and implements the traffic control measure with respect to the affected cellular devices wherein the traffic control measure prevents placing calls from the affected cellular devices.

28. A traffic control system for controlling traffic on a cellular network, the system comprising:

a plurality of cellular facilities;

a network control center that:
  receives occupancy data associated with each cellular facility;
  determines traffic intensity at each cellular facility; and
  relays the traffic intensity to a traffic engineering database;
a traffic engineering database that stores traffic intensity; and
a traffic control application that:
  extracts the traffic intensity corresponding to a selected cellular facility from the traffic engineering database;
  determines at least one traffic control measure to be imposed in a geographic location associated with the selected cellular facility, based upon the traffic intensity corresponding to the selected cellular facility;
  retrieves a list of affected cellular devices wherein the affected cellular devices include all cellular devices having a subscriber identifier to be controlled and associated with the geographic location associated with the selected cellular facility; and
  implements the traffic control measure with respect to the affected cellular devices wherein the traffic control measure prevents each of the affected cellular devices from exceeding maximums for at least one of a number of calls placed or a duration of calls placed and wherein the network control center sends a message to the affected cellular devices, the message indicating that the traffic control measure is in effect.

29. A method for alerting communications devices of a temporary altered cost for using a communications network, comprising:
  monitoring traffic intensity of a plurality of network elements;
  when the traffic intensity at a selected network element is outside a predetermined range, retrieving a list of affected communications devices wherein the affected communications devices include each communications devices associated with a subscriber identifier to be controlled and associated with the network element;
  implementing a traffic control measure according to a control plan associated with each affected communications device wherein the traffic control measure includes altering a cost of placing a call from each of the affected communications devices and preventing each of the affected communications devices from exceeding maximums for at least one of a number of calls placed or a duration of calls placed; and
  sending a message to each of the affected communications devices to indicate that the traffic control measure is in effect wherein the cost altered varies between the affected communication devices based on a degree of control the traffic control measure exerts on each affected communication device.

30. The method of claim 29, wherein sending the message comprises sending an SMS message to each of the affected communications devices.

31. The method of claim 29, wherein sending the message comprises placing a call.

32. The method of claim 29, wherein sending the message comprises causing the affected communications devices to vibrate.

33. The method of claim 29, wherein sending the message comprises causing the affected communications devices to emit a tone.

* * * * *